United States Patent
Huang

(10) Patent No.: US 7,987,753 B2
(45) Date of Patent: Aug. 2, 2011

(54) APPARATUS AND METHOD FOR CUTTING INJECTION MOLDED PRODUCT

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 433 days.

(21) Appl. No.: 12/177,409

(22) Filed: Jul. 22, 2008

(65) Prior Publication Data
US 2009/0096128 A1 Apr. 16, 2009

(30) Foreign Application Priority Data
Oct. 16, 2007 (CN) .......................... 2007 1 0202079

(51) Int. Cl.
*B26D 7/10* (2006.01)

(52) U.S. Cl. ............... 83/171; 83/158; 83/167; 83/267; 83/409.1; 83/651.1; 83/956

(58) Field of Classification Search ...... 83/16, 158–160, 83/167, 171, 267, 409, 409.1, 651.1, 783, 83/786, 956, 111
See application file for complete search history.

(56) References Cited

U.S. PATENT DOCUMENTS

| | | | | | |
|---|---|---|---|---|---|
| 3,017,487 | A | * | 1/1962 | Priestly | 83/171 |
| 3,830,123 | A | * | 8/1974 | Wilgus | 83/171 |
| 4,015,499 | A | * | 4/1977 | Arthaud | 83/752 |
| 4,608,893 | A | * | 9/1986 | Huhne | 83/171 |
| 4,673,787 | A | * | 6/1987 | Inoue | 219/69.12 |
| 5,533,430 | A | * | 7/1996 | Buch | 83/171 |
| 5,819,615 | A | * | 10/1998 | Dale et al. | 83/13 |
| 6,925,693 | B2 | * | 8/2005 | Takeuchi et al. | 29/25.35 |
| 7,077,040 | B1 | * | 7/2006 | Carbonaro | 83/13 |
| 7,347,766 | B2 | * | 3/2008 | Nitta et al. | 451/11 |

FOREIGN PATENT DOCUMENTS

| | | | |
|---|---|---|---|
| CN | 1970250 A | | 5/2007 |
| JP | 2002-1720 A | | 1/2002 |
| KR | 2002-0052423 | * | 7/2002 |

* cited by examiner

*Primary Examiner* — Edward Landrum
(74) *Attorney, Agent, or Firm* — Andrew C. Cheng

(57) ABSTRACT

A cutting machine is configured for cutting an injection molded original product. The injection molded original product has a component and stub bar connected to the component. The cutting machine includes a base portion, a supporting arm attached to the base portion, and a cutting device coupled to the supporting arm. The cutting device includes an electrothermal cutting line for cutting the component off the stub bar.

15 Claims, 5 Drawing Sheets

APPARATUS AND METHOD FOR CUTTING INJECTION MOLDED PRODUCT

BACKGROUND

1. Technical Field

The present invention relates to an apparatus and method for cutting injection molded original products.

2. Description of Related Art

Products such as optical lenses are major components in apparatuses such as camera devices. Optical lenses are typically made by injection molding.

An injection molded original product straight out of the mold typically includes a stub bar connected to one or more of the products, such as a row of optical lenses. A cutting machine is used to cut the products off the stub bar. Generally, the cutting machine is a heated metal knife. However, cutting edges made on the optical lenses by the heated metal knife may be too rough to satisfy the precision requirements of optical lenses. As a result, further processing of the optical lenses may be required.

Therefore, an improved cutting apparatus and method to cut injection molded original products and leave sharper cutting edges thereon is desirable to overcome the above-described deficiencies.

SUMMARY

A cutting machine apparatus is configured for cutting an injection molded original product. The injection molded original product has at least one component and a stub bar connected with the at least one component. The cutting machine includes a base portion, a supporting arm attached to the base portion, and a cutting device coupled to the supporting arm. The cutting device includes an electrothermal cutting line for cutting the at least one component off the stub bar.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
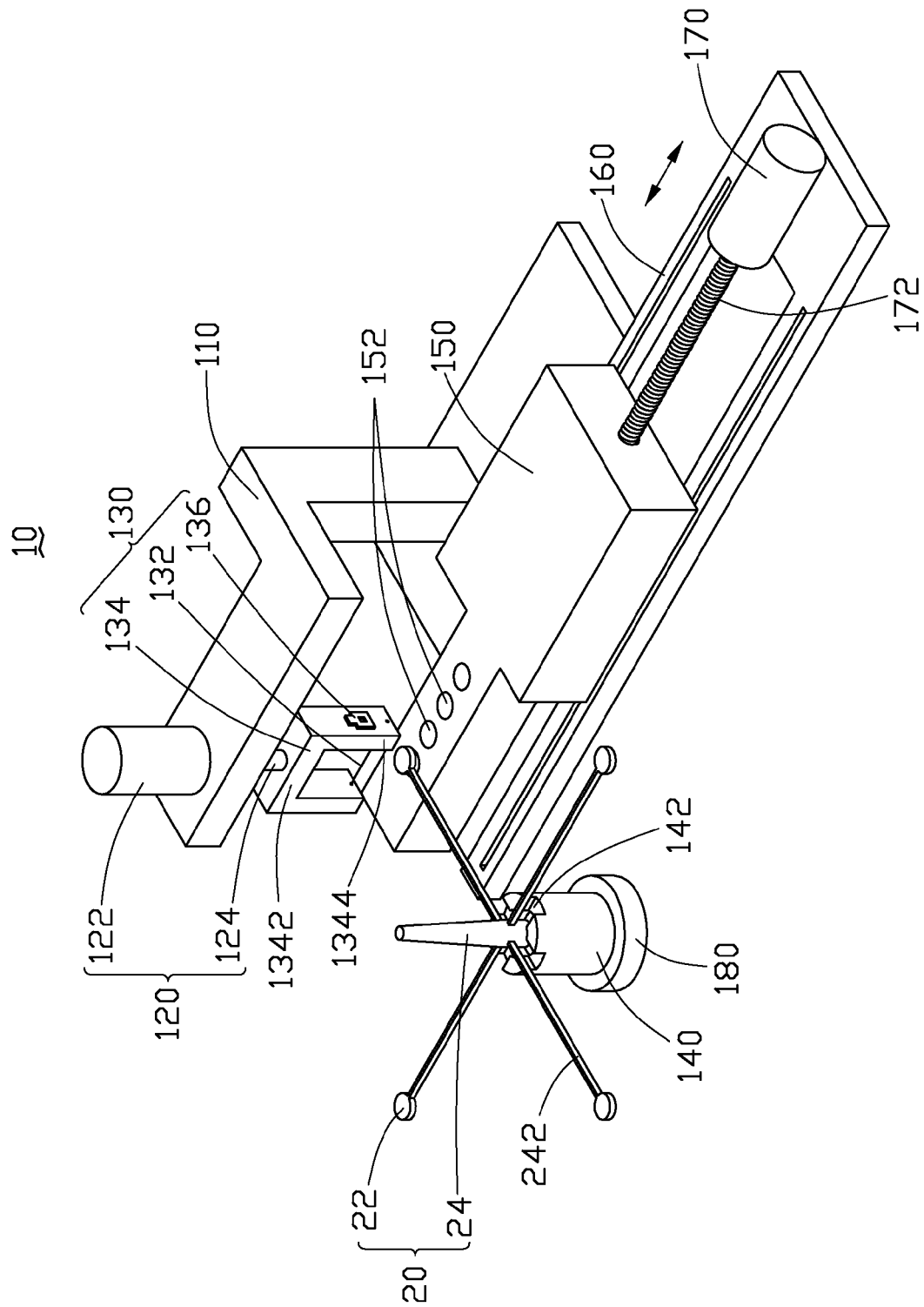
FIG. 1 is a schematic, isometric view of a present embodiment of a cutting machine apparatus, the cutting machine apparatus including a supporting device, an electrothermal cutting line, and an ultrasonic generator.

Referring to FIG. 1, a cutting machine apparatus 10, according to a present embodiment, includes a base portion 160, a supporting arm 110 attached to the base portion 160, a cutting device 130 coupled to the supporting arm 110, and a working table 150 on the base portion 160.

The working table 150 is slidingly coupled to the base portion 160. A first motor 170 is applied to drive the working table 150 to slide on the base portion 160. A rod 172 extends from the motor 170. The rod 172 is threadedly connected to the working table 150. A plurality of receptacles 152 are positioned in a top surface of the working table 150. The receptacles 152 are arranged in a line along the sliding direction of the working table 150. The receptacles 152 are configured for receiving a component 22 or a lens 22 cut by the cutting machine 10.

A driving device 120 is attached to the supporting arm 110. In one embodiment, the driving device 120 includes a gas cylinder 122 and a connecting rod 124 connected to piston (not shown) inside the gas cylinder 122. The connecting rod 124 is coupled to the cutting device 130. The connecting rod 124 is configured for driving the cutting device 130 to move towards the working table 150 to cut a injection molded original product. In another embodiment, the driving device 120 can be a step motor or another kind of cylinder such as a hydraulic cylinder.

In one embodiment, the cutting device 130 includes body 134 that is U-shaped. In another embodiment, the body 134 can be any shape, such as arc-shaped, H-shaped, or V-shaped. The cutting device 130 includes a level portion 1342 and two perpendicular portions 1344 that extend substantially perpendicularly from the level portion 1342 such that the opening of the U shaped body 134 faces the working table 150. An electrothermal cutting line 132 connects to the ends of the two perpendicular portions 1344. In one embodiment, the electrothermal cutting line 132 is parallel to the sliding direction of the working table 150. In operation, the electrothermal cutting line 132 is heated by applying a current to the electrothermal cutting line 132. A material of the electrothermal cutting line 132 can be a metal (e.g., steel, copper, and tungsten).

The cutting device 130 further includes an ultrasonic generator 136. The ultrasonic generator 136 is secured to one of the perpendicular portions 1344. As the electrothermal cutting line 132 cuts the injection molded original product 20, the ultrasonic generator 136 generates ultrasonic vibrations to increase the cutting speed of the cutting device 130 and achieving a smooth cutting edge of the injection molded original product 20. The material of the ultrasonic generator 136 is a piezoelectric material. The piezoelectric material can generate ultrasonic waves when a current is applied to the material. In the present embodiment, the material of the ultrasonic generator 136 is a piezoelectric ceramic, such as barium titanate or lead zirconate-titanate. In another embodiment, the material of the ultrasonic generator 136 can be a piezoelectric monocrystal material (e.g., crystal, lithium niobate, and germanium niobate), a piezoelectric film, or a piezoelectric polymer.

Figure 2:
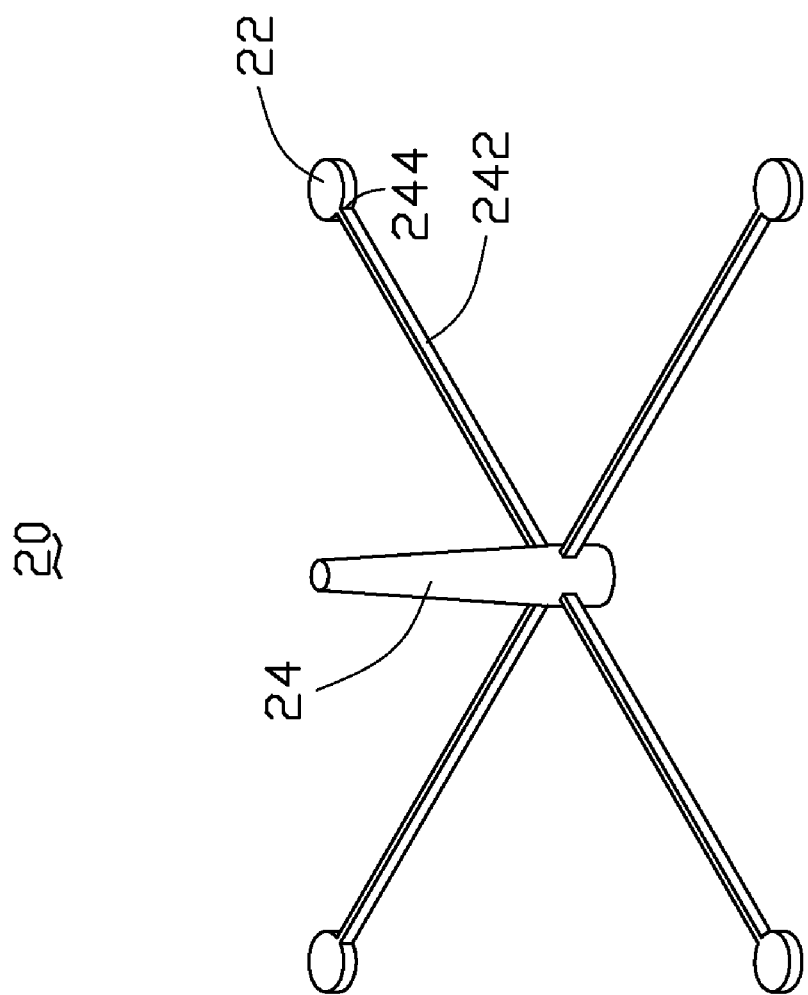
FIG. 2 is a schematic, isometric view of an injection molded original product in FIG. 1.

Referring also to FIG. 2, an injection molded original product 20 made by a four-cavity molding process is shown. The injection molded original product 20 includes a stub bar 24 having four branches 242, and four lenses 22 attached to the four branches 242 at a connecting portion 244. In operation, the injection molded original product 20 is removably fixed on a supporting device 140. The supporting device 140 includes a hole (not shown) for receiving the stub bar 24 and defines four grooves 142 around the hole for receiving the four branches 242. The supporting device 140 further includes a second motor 180 for driving the supporting device 140 to rotate around the central axis of the stub bar.

Figure 3:
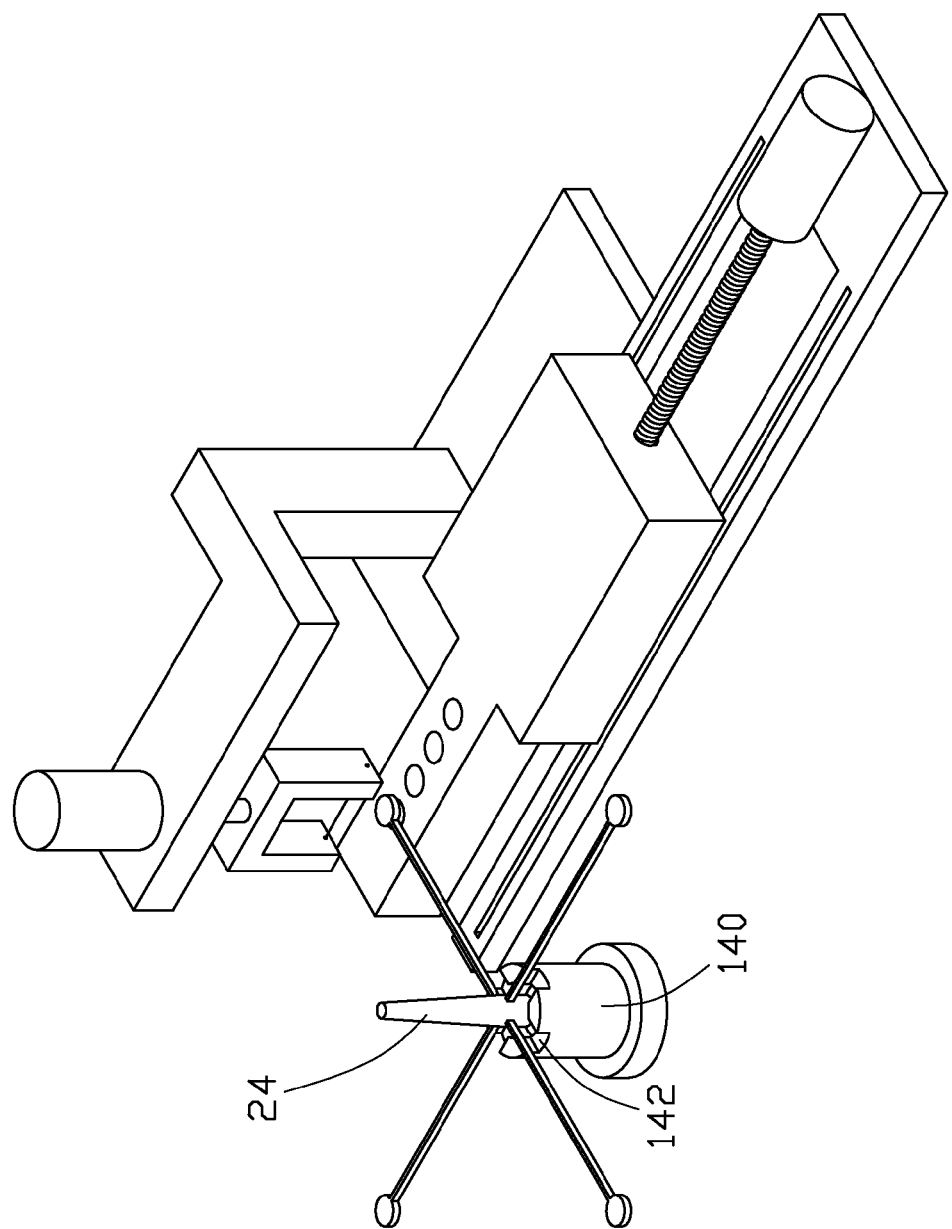
FIG. 3 is a schematic, isometric view of the cutting machine apparatus, showing the original injection molded product on the supporting device.
Figure 4:
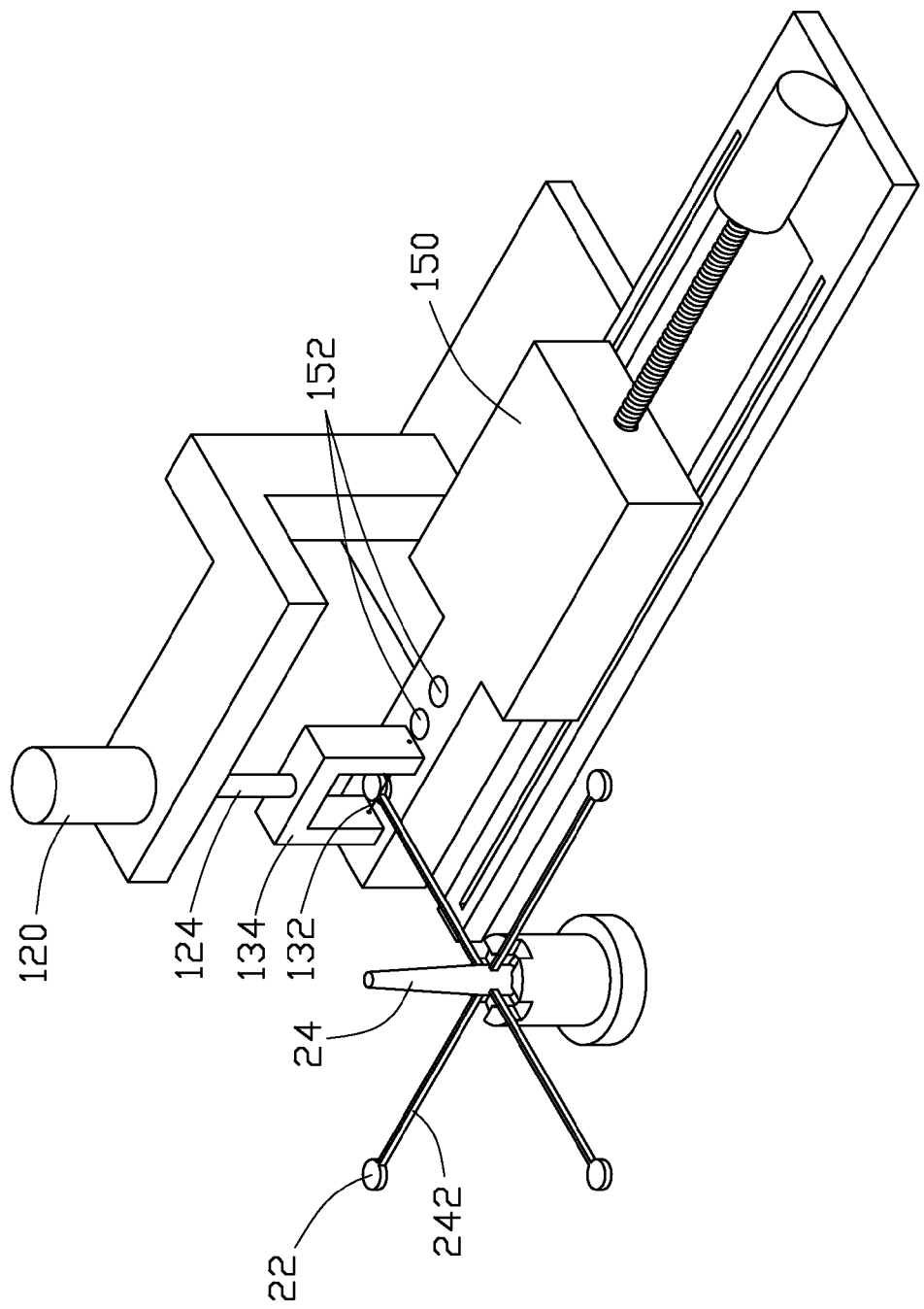
FIG. 4 is a schematic, isometric view of the cutting machine apparatus, showing the electrothermal cutting line cutting the original product.
Figure 5:
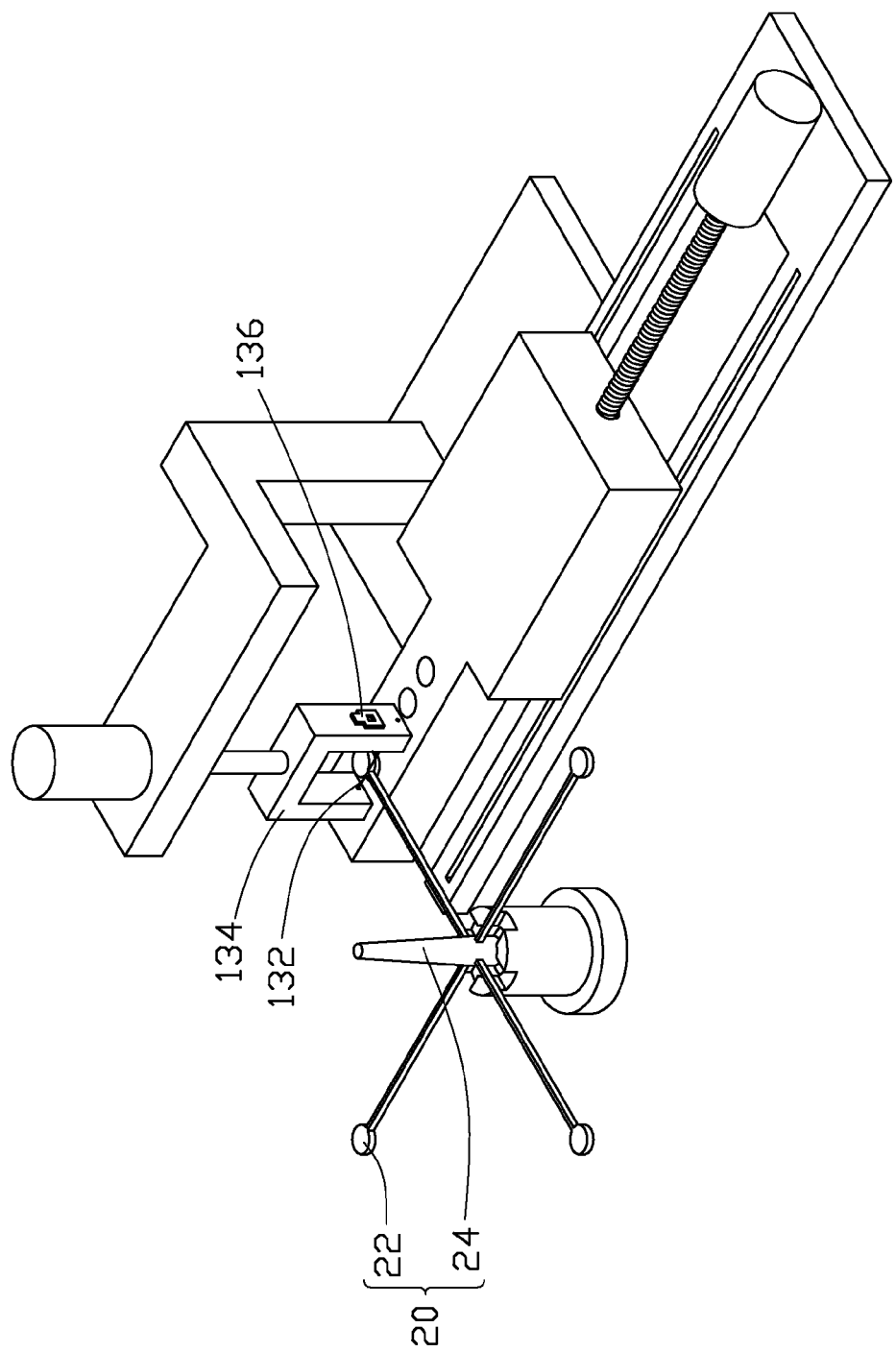
FIG. 5 is a schematic, isometric view of the cutting machine apparatus, showing the ultrasonic generator on the cutting machine.

Referring to FIGS. 3-5, a method for cutting the injection molded original product 20 using the cutting machine 10 is illustrated.

The injection molded original product 20 is removably fixed on the supporting device 140. One of the lenses 22 is positioned above one of the plurality of receptacles 152. The supporting arm 110 then drives the position of the electrothermal cutting 132 towards the connecting portion 244.

A current is applied to the electrothermal cutting line 132, thereby heating the electrothermal cutting line 132. As the electrothermal cutting line 132 contacts the connecting the portion, the connecting portion 244 is heated and cut by the electrothermal cutting line 132 until the lens 22 is cut off the stub bar 24 and falls into the socket 152.

During the cutting process, the ultrasonic generator 136 can be applied to generate ultrasonic vibrations to increase the cutting speed of the cutting device 130, resulting in a smooth cutting edge.

It is to be understood, however, that even though numerous characteristics and advantages of the embodiments have been set forth in the foregoing description with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutting machine apparatus for cutting an injection molded original product, the original product having a number of components and a stub bar connected with the components, the cutting machine apparatus comprising:
   a base portion,
   a supporting arm attached to the base portion,
   a working table on the base portion configured for receiving the components,
   a first driving device for driving the working table to slide on the base portion, and
   a cutting device coupled to the supporting arm, wherein the cutting device comprises an electrothermal cutting line configured for directly contacting and cutting the components off the stub bar, the cutting line being parallel to the sliding direction of the working table.

2. The cutting machine apparatus of claim 1, wherein the electrothermal cutting line is steel, copper, or tungsten.

3. The cutting machine apparatus of claim 1, wherein the first driving device is a motor, the cutting machine apparatus further comprising a rod extending from the motor, the rod threadedly connected to the working table.

4. The cutting machine apparatus of claim 1, wherein the working table comprises a plurality of receptacles for receiving the components.

5. The cutting machine apparatus of claim 4, wherein the receptacles are arranged in a line along the sliding direction of the working table.

6. The cutting machine apparatus of claim 1, further comprising a supporting device for fixing the injection molded original product, the supporting device comprising a hole for receiving the stub bar, and defining a number of grooves around the hole for receiving branches of the stub bar, the branches connected to the components.

7. The cutting machine apparatus of claim 6, further comprising a motor for driving the supporting device to rotate around the central axis of the stub bar.

8. The cutting machine apparatus of claim 1, wherein the cutting device further comprises an ultrasonic generator for generating ultrasonic vibrations.

9. The cutting machine apparatus of claim 8, further comprising a second driving device for driving the cutting device towards the base portion.

10. The cutting machine apparatus of claim 8, wherein the ultrasonic generator is comprised of a piezoelectric material.

11. The cutting machine apparatus of claim 10, wherein the piezoelectric material is a piezoelectric monocrystal, a piezoelectric film, a piezoelectric polymer, or a piezoelectric ceramic.

12. The cutting machine apparatus of claim 11, wherein the piezoelectric ceramic is selected from the group consisting of barium titanate and lead zirconate-titanate.

13. The cutting machine apparatus of claim 11, wherein the piezoelectric monocrystal is crystal, lithium niobate, or germanium niobate.

14. The cutting machine apparatus of claim 8, wherein the cutting device comprises an opening and the electrothermal cutting line connects to two opposite sides of the opening.

15. The cutting machine apparatus of claim 14, wherein the cutting device comprises a level portion and two perpendicular portions protruding from the level portion perpendicularly; the electrothermal cutting line connects to the two perpendicular portions; and, the ultrasonic generator is attached to one of the perpendicular portions.

\* \* \* \* \*